June 28, 1960     R. GODBARSEN, JR     2,943,198
RAY SENSITIVE SCREEN AND ASSOCIATED APPARATUS
Filed July 9, 1953     6 Sheets-Sheet 1
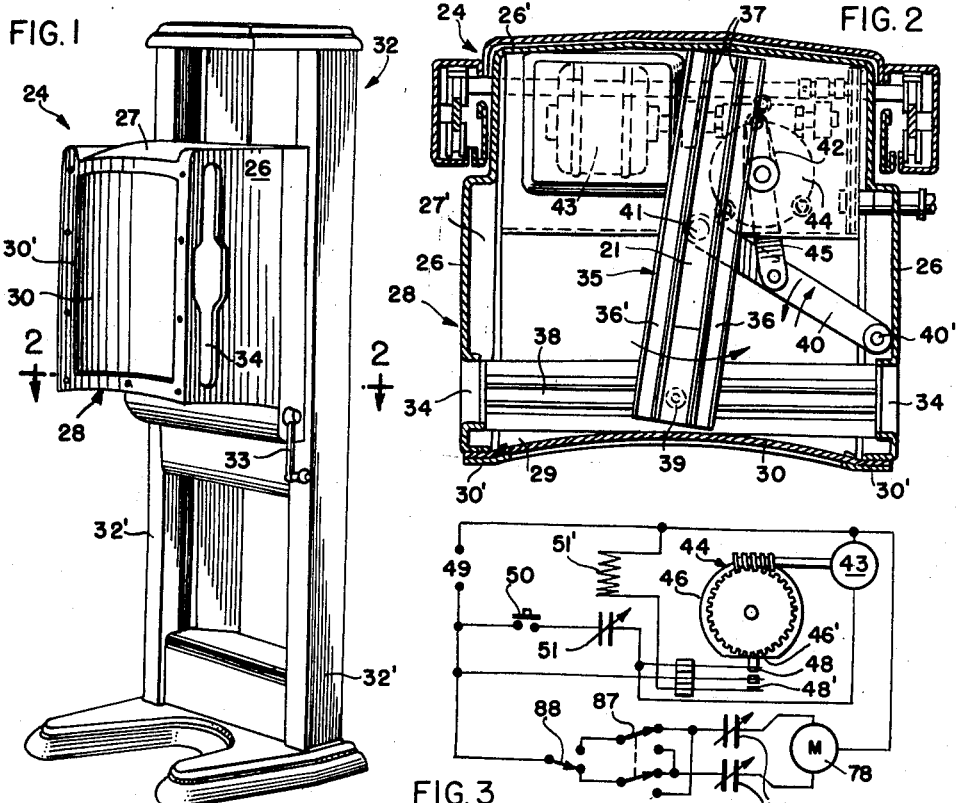
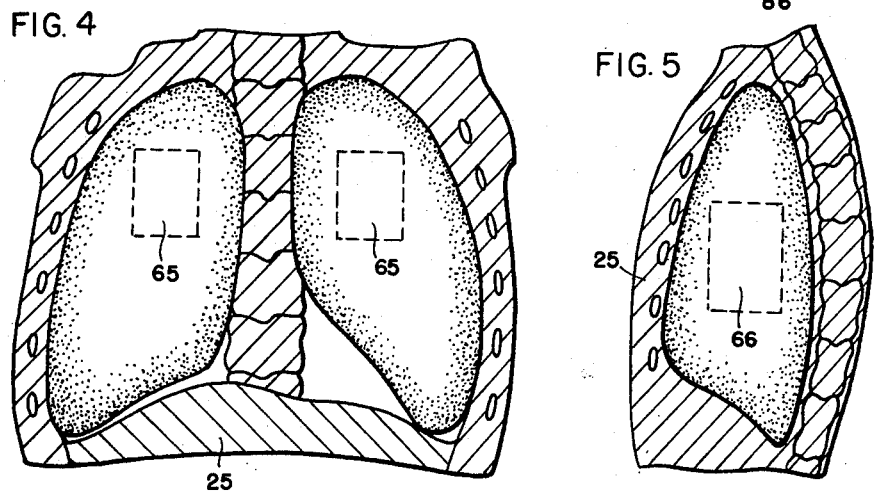
INVENTOR:—
ROBERT GODBARSEN, JR.
BY:—
Junius F. Cook, Jr.
ATTORNEY

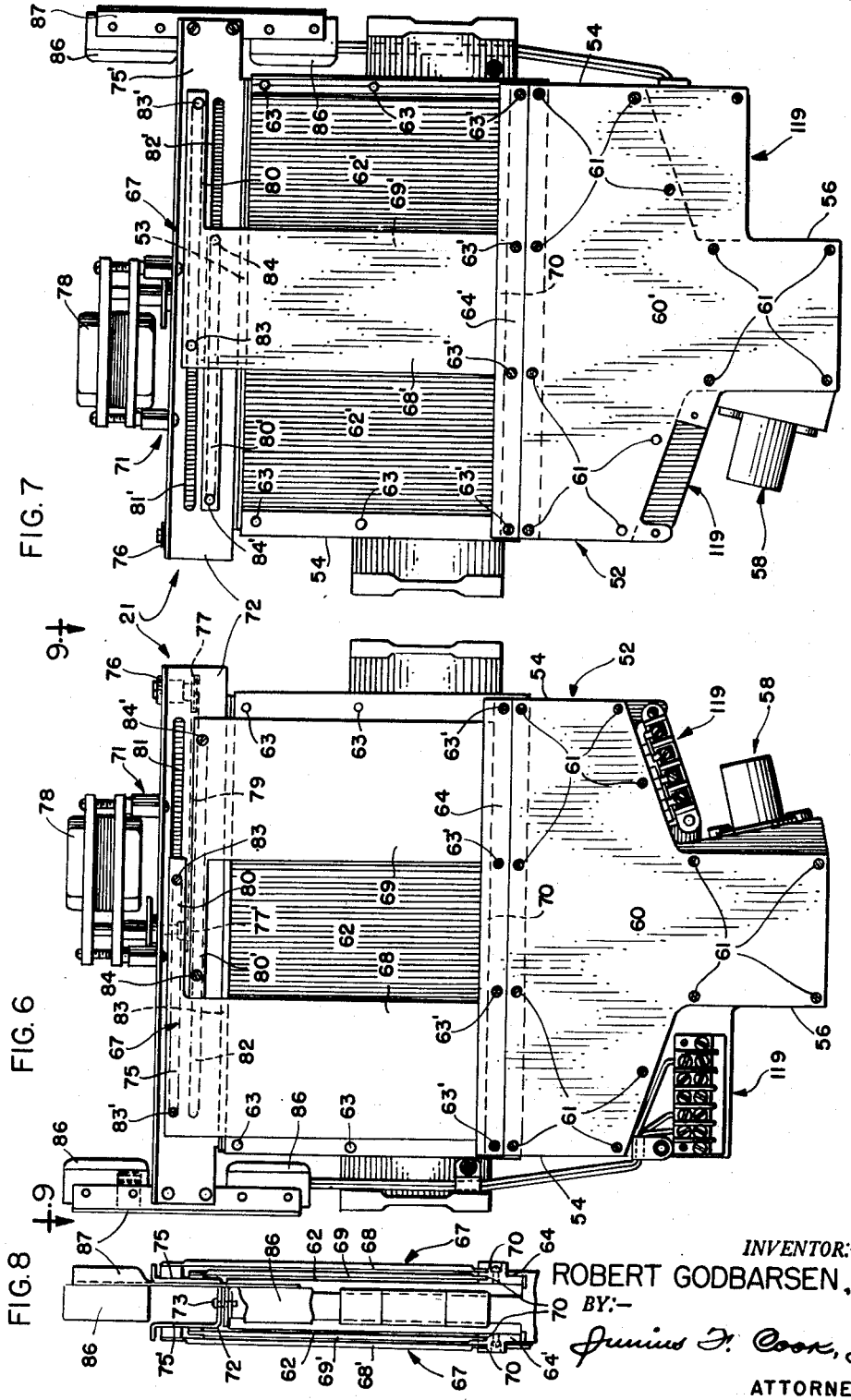

June 28, 1960 R. GODBARSEN, JR 2,943,198
RAY SENSITIVE SCREEN AND ASSOCIATED APPARATUS
Filed July 9, 1953 6 Sheets-Sheet 3
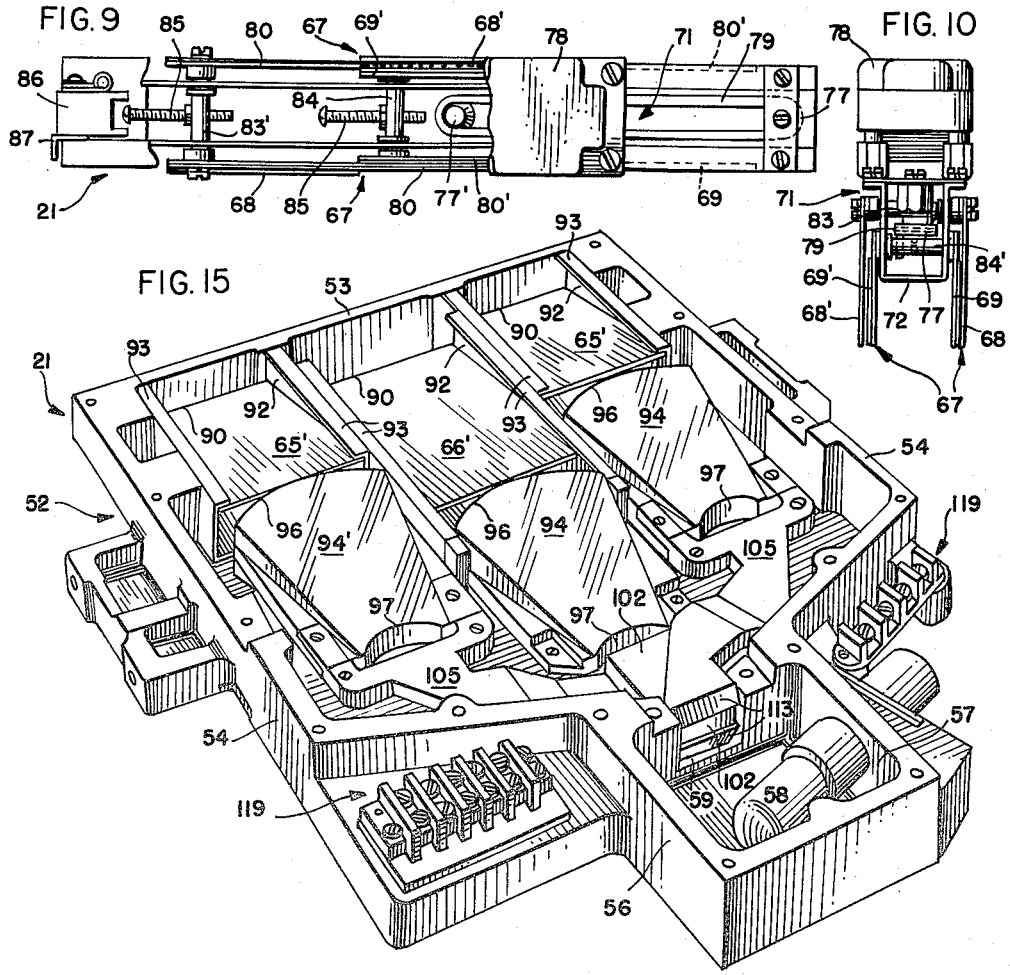
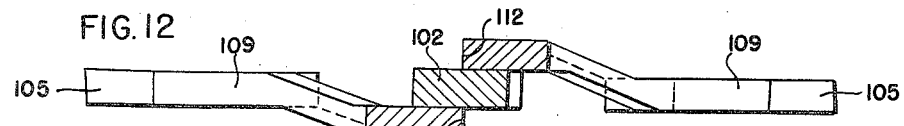
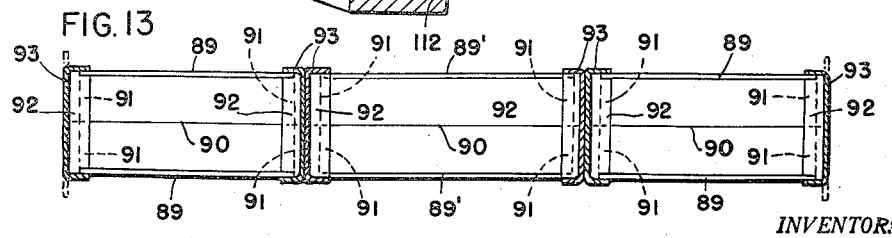
INVENTOR:—
ROBERT GODBARSEN, JR
BY:—
Junius F. Cook, Jr.
ATTORNEY

INVENTOR:—
ROBERT GODBARSEN, JR
BY:—
ATTORNEY

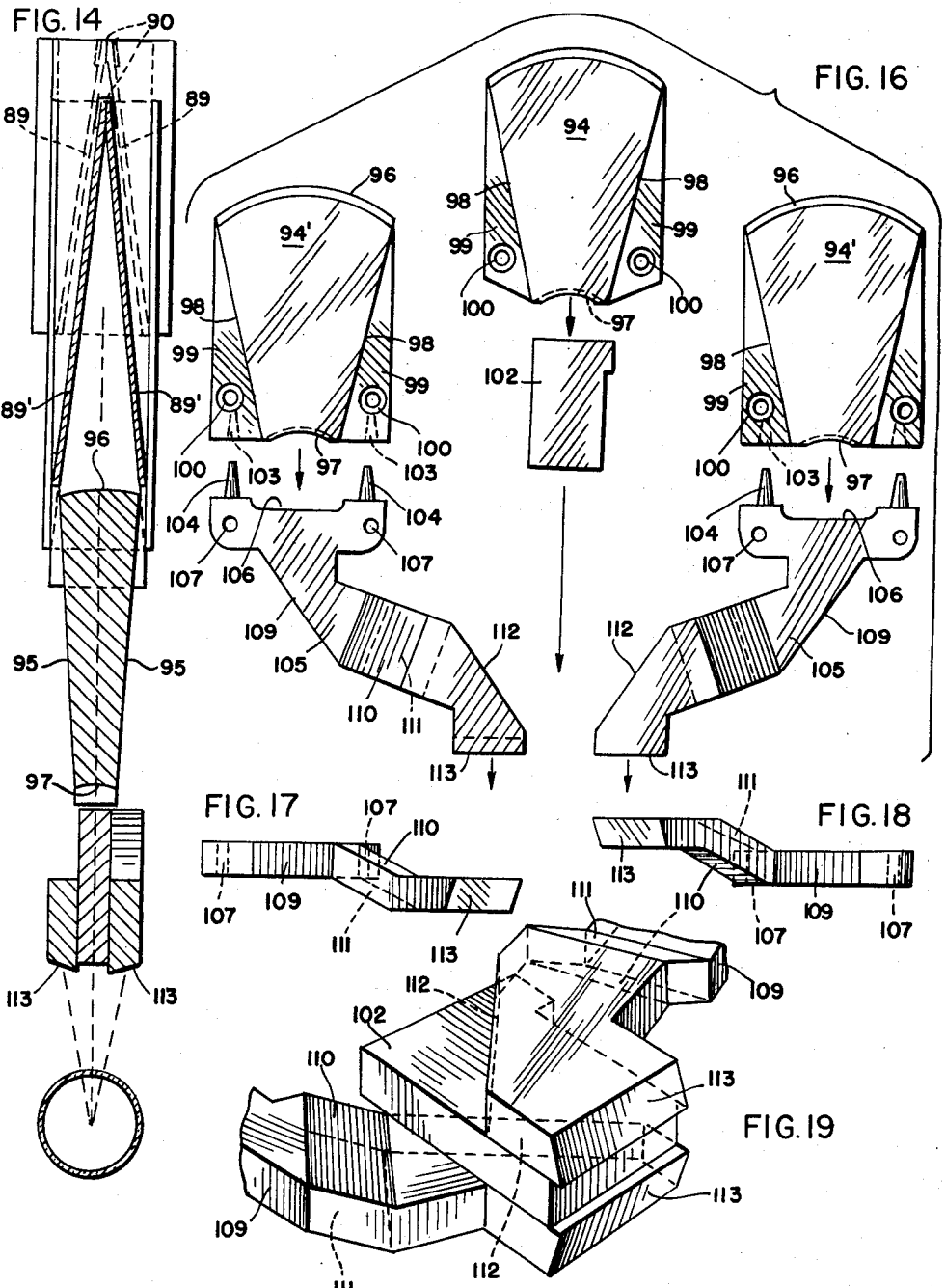

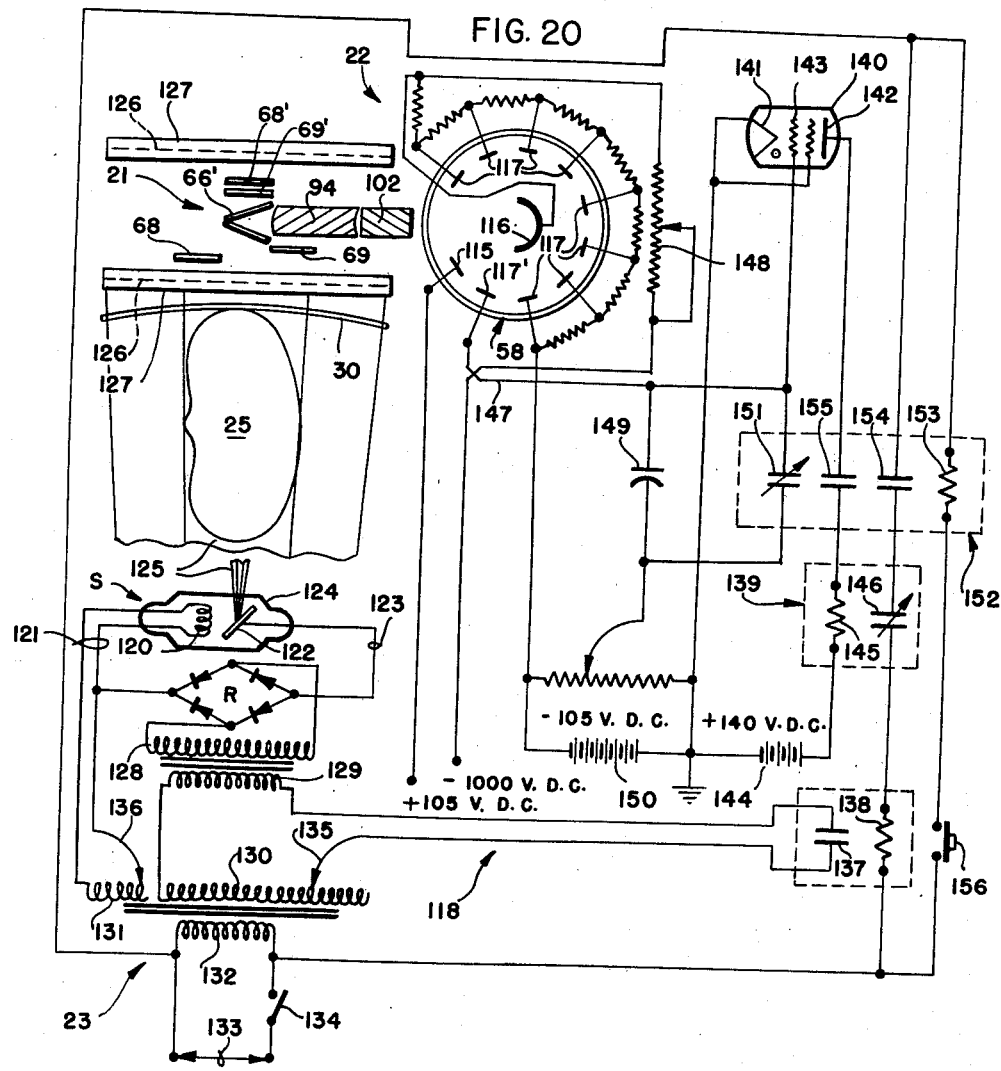

United States Patent Office 2,943,198
Patented June 28, 1960

2,943,198

RAY SENSITIVE SCREEN AND ASSOCIATED APPARATUS

Robert Godhansen, Jr., Milwaukee, Wis., assignor to General Electric Company, a corporation of New York Filed July 9, 1953, Ser. No. 367,000

19 Claims. (Cl. 250—71)

The present invention relates in general to sensitive screen means for detecting penetrating rays, such as X-rays, and has more particular reference to screen means adapted, when exposed to the action of penetrating rays, to emit rays of characteristic wave length, in quantity substantially proportional to the quanta of penetrating rays impinging thereon, so that the screen means may be employed, in conjunction with a suitable light sensitive detector, for measuring the penetrating rays in terms of the response of the light sensitive detector.

X-ray photographs, commonly called radiographs, may be produced by causing rays, emitted from a suitable X-ray source, to traverse the object to be pictured and to impinge upon a layer of ray sensitive picturing material, during an appropriate exposure interval, to thus create in the picturing material a latent picture image. The so exposed sensitive material may then be treated chemically to develop the latent image as a visible picture therein. Ray sensitive material used in making radiographs is, usually, if not always, also sensitive to visible light. Accordingly, prior to exposure and development, ray sensitive material normally is enclosed in light-tight container or cassette means of ray pervious material, and, so enclosed, may be mounted in a cassette carrier in position to be exposed to X-rays.

Cassette carriers or holders may be of the sort adapted to receive a single cassette, containing sensitive material, and to support the same in position to be exposed. Cassette holders may also be provided, in conjunction with cassette changing apparatus, for presenting a plurality of cassettes, containing ray sensitive material, successively in position for X-ray exposure. Serialographic equipment also may be furnished for projecting a cassette, containing ray sensitive material, successively from a retracted to several relatively offset picturing positions, to thereby allow for the successive exposure of adjacent portions of the cassette enclosed sensitive material in making a series of related ray pictures therein.

Apparatus for timing the operation of penetrating ray equipment for the determination of ray exposure intervals in making radiographs, as well as when applying penetrating rays to other useful purposes, commonly comprises switch means controllingly connected with the ray emitting equipment, and operating means for causing such switch means to close and open, respectively, at the beginning and at the conclusion of the exposure interval, to thereby initiate and terminate the effective operation of the ray emitting equipment. Such operating means may comprise adjustable apparatus for measuring any selected elapsed time interval, within the range of the equipment, and means for starting the timing apparatus in operation coincidentally with the starting in operation of the ray emitting equipment, the timing apparatus being operatively associated with the controlling switch means of the ray emitting apparatus to stop ray emission therefrom precisely at the conclusion of the ray exposure interval.

As disclosed, for example, in United States Letters Patent No. 2,401,289 of May 28, 1946, covering the joint invention of Russell H. Morgan and Paul C. Hodges in X-Ray Exposure Timing Apparatus, it has been proposed to measure penetrating ray exposure intervals in terms of the aggregate quanta of rays delivered, by ray emitting apparatus, during an exposure interval, and to terminate the exposure interval as and when the measured ray quanta reaches a selected total value. To this end, rays delivered by the ray emitting equipment, during the exposure interval, may be applied to suitable material adapted to emit light rays of characteristic wave length in proportion to the quanta and intensity or quality of penetrating rays impinging thereon. The amount of radiation thus applied to the light sensitive material may be determined by measuring the light emitted from the sensitive material, as by means of a suitable detector that is sensitive to such emitted light; and suitable integrating means for measuring the aggregate quantity of light emitted by the sensitive material during an exposure interval may be provided in association with such detector means, in order to cause the performance of any desired operation, such, for example, as the disablement of the ray generating apparatus, after the same has been in operation during an interval of sufficient length to cause emission of a predetermined aggregate quanta of radiation.

An important object of the present invention is to provide screen means adapted to be disposed in the path of penetrating rays, such as X-rays, and to emit light rays of characteristic wave length in quantity proportional to the amount of radiation to which the screen may have been subjected; a further object being to provide, in conjunction with the screen, suitable detector means, sensitive to light rays of the sort produced by the screen when exposed to penetrating rays, such as X-rays, and adapted, in cooperation with suitable associated translation means, to control the operation of apparatus of any desired character, such as apparatus for disabling the operation of ray emitting equipment to thus terminate the exposure interval.

Another important object is to provide sensitive screen means particularly well adapted for use in timing the exposure of radiographs of the human chest; a further object being to provide screen means of the character mentioned adapted selectively to be conditioned to respond to penetrating rays, such as X-rays, traversing different scanning zones, such as the upper lung scanning zones preferred in frontal chest radiography, and the somewhat lower, mid-lung scanning zone preferred in transverse chest radiography, wherein ray pictures are made through the body of the picture subject from one side thereof to the other.

Another important object is to provide ray sensitive screen means adapted for use in conjunction with cassette changing mechanism for timing radiographic exposures of cassette enclosed ray sensitive material supported in the cassette changing mechanism.

Another important object is to provide a sensitive screen of the character mentioned, particularly well suited for interval timing in connection with the making of radiographs on cassette mounted ray sensitive material supported in cassette changing equipment of the sort adapted to present a pair of film mounted cassettes, in back-to-back relationship, alternately in position facing toward and facing away from a source of picturing rays.

Another important object resides in providing a sensitive screen unit having oppositely facing ray receiving sides and adapted to give precisely the same emitted light response to ray impingement thereon regardless of which side of the unit is faced toward the source of exciting rays; a further object being to provide a ray responsive screen unit having oppositely facing ray receiving sides, including ray opaque shutter means disposed upon opposite sides of the unit and adjustable to selectively screen portions of both said oppositely facing sides of the unit against ray impingement, thereby uncovering adjacent portions of one of said sides for ray excitation; a still further object being to arrange said shutters to block penetration of exciting rays, at such exposed portions, beyond the screen unit, on the sides thereof facing away from the source of penetrating rays being detected.

Another important object is to provide a screen unit having a pair of ray sensitive elements in spaced apart relation in position to register, respectively, with the left and right center lung portions of the average human being, and an additional ray sensitive element adapted to register with the somewhat lower mid-lung portions of such average human being, the same representing desirable scanning areas employed, respectively, in frontal and in lateral chest radiography; a further object being to provide means selectively operable to screen either the spaced apexial scanning elements or the lateral scanning element against ray impingement; a still further object being to provide for so screening said center elements, on one side of the unit, while screening the lateral scanning element, on the opposite side of the unit, and vice versa; yet another important object being to provide for shifting said shutters automatically from one screening position to the other, when a cassette changing apparatus, in which the ray sensitive unit is operatively mounted, is actuated to shift one cassette therein into and the other out of position for ray exposure of sensitive material enclosed therein.

Another important object is to provide a generally flat screen unit of relatively shallow depth and having oppositely facing, ray receiving side faces, whereby said unit may be disposed between cassettes containing ray sensitive material and mounted in back-to-back, closely spaced and oppositely facing relationship, said unit embodying a ray sensitive element disposed between said faces in position to emit light in a direction, parallel to and between said faces and toward an end edge of said unit, in response to the application of exciting rays thereto, at said faces, in either of two opposite directions; a further object being to utilize a pair of relatively inclined plates of ray sensitive light emitting material, disposed between the opposite faces of the screen unit and adapted to emit light in the direction of divergence of said inclined plates; a further object being to dispose a light sensitive detector element, such as a photoelectric tube, in said unit, in position to respond to light emitted by and between said mutually inclined plates.

Another important object resides in providing suitable light guide means, in the unit, between the ray sensitive element and the light sensitive detector tube to assure application, upon said tube, of substantially all of the light emitted by said element, as the result of ray activation thereof; a further object being to utilize light reflecting mirror surfaces for such purpose; a still further object being to form such mirror surfaces as the bounding surfaces of light transmitting blocks of material such as acrylic plastic, whereby substantially all of the light, emitted by the ray sensitive material, may be delivered to the photosensitive detector tube.

The foregoing and numerous other important objects, advantages, and inherent functions of the invention will become apparent as the same is more fully understood from the following description, which, taken in conjunction with the accompanying drawings, discloses a preferred embodiment of the invention.

Referring to the drawings:

Fig. 1 is a perspective view showing a type of cassette changer in which apparatus embodying the present invention may be mounted for use in determining X-ray exposure intervals;

Fig. 2 is a sectional view taken substantially along the line 2—2 in Fig. 1;

Fig. 3 is a diagram of electrical connections;

Figs. 4 and 5 are diagrammatic views showing preferred scanning areas of the human chest respectively employed in frontal and lateral chest radiography;

Figs. 6 and 7 are opposite face views of an X-ray detecting screen unit embodying the present invention and including a selectively operable shutter mechanism mounted in operative position thereon;

Fig. 8 is an end view of the screen unit as seen from the left and right hand ends, respectively, of Figs. 6 and 7;

Fig. 9 is a top view, partially sectionalized, of the structure shown in Figs. 6 and 7;

Fig. 10 is an end view of the structure shown in Fig. 9 as seen from the right hand end thereof;

Figure 11:
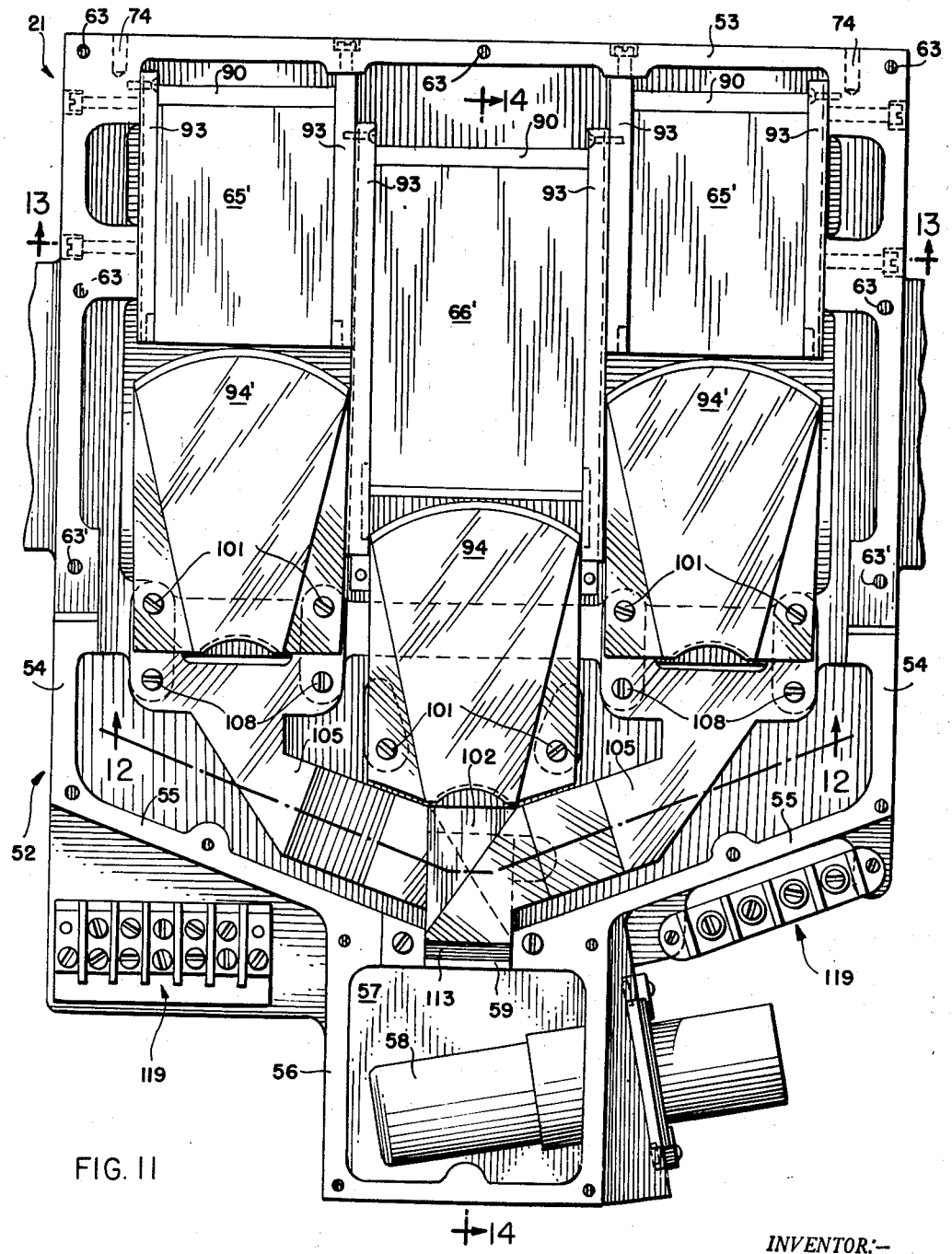
Fig. 11 is a view of the apparatus shown in Fig. 6 with the shutter mechanism and front cover removed to reveal the internal structure of the ray detecting screen unit.

Figs. 12, 13 and 14 are sectional views taken substantially along the lines 12—12, 13—13 and 14—14 in Fig. 11;

Fig. 15 is a perspective view of portions of the unit;

Fig. 16 is a view of light transmitting elements employed in the ray detecting screen unit;

Figs. 17 and 18 are side views of elements shown in Fig. 16;

Fig. 19 is an enlarged view of portions of the structure shown in Figs. 11, 12, 14 and 15; and Fig. 20 is a diagram of electrical equipment with which the screen unit may be employed for the exposure interval timing of X-ray photographs.

To illustrate the invention, the drawings show a ray sensitive detector unit 21, particularly adapted for placement in the path of penetrating rays, such as X-rays, to measure the amount or intensity thereof, and a translation system 22 actuated by said detector unit for controlling the operation of any equipment which it may be desired to control in accordance with measured characteristics of such rays.

As shown, the translation system 22 is of a sort adapted to measure total ray quanta delivered during ray exposure intervals and to operate apparatus for the stopping of emission of the rays, after delivery of a selected or predetermined quanta thereof. More particularly, the unit 21 and system 22 are shown in conjunction with radiographic equipment 23, thus providing means for timing short exposure intervals by measuring ray quanta delivered, for picturing purposes, through an object to be pictured and thence upon ray sensitive picturing material, supported in the equipment 23, during an exposure interval, and for terminating the exposure interval when a selected ray quanta shall have been applied to the picturing material. Specifically, the illustrated unit is formed for use in cassette changing apparatus 24 of the sort shown in United States Letters Patent No. 2,277,330, of March 24, 1942, covering the invention of Arthur J. Kizaur, the same comprising mechanism for successively presenting cassettes containing ray sensitive material in position for ray exposure, in the making of radiographic pictures of the chest portions of a human picture subject 25.

It will be understood, however, that the invention, in its broader aspects, is not necessarily limited to apparatus for use in human chest radiography, nor to the specific cassette changer shown, nor indeed to apparatus embodying cassette changing apparatus, nor to the timing of radiographic exposure intervals, nor to the measurement of ray quanta, such environmental aspects being illustrated and described in order to demonstrate the invention and not by way of limitation.

The cassette changing mechanism with which the detector unit of the present invention may be used may comprise suitable frame means forming the opposite side walls 26, the back wall 26', a top wall 27, and a bottom wall 27' of a casing 28, which may conveniently be formed of sheet metal, although any other suitable material may be utilized to form the casing as a housing in which the operating parts of the cassette changing equipment may be housed. If desired, the casing may be formed of material impervious to X-rays, or may be lined with such material. The front of the casing is formed with an opening 29 which, in the illustrated embodiment, is closed by a preferably curved panel 30 of X-ray transparent material, such as Bakelite or other suitable panel forming material, the panel being secured in the opening in any suitable or preferred fashion, as by means of a finishing strip 30' held by suitable fastening means, such as screws or the like, upon the edges of the panel and of the casing which define the opening 29. Ray sensitive sheet material 31 may be mounted within the housing, behind the panel 30, in position to be exposed for the purpose of making, upon such material, radiographs of an object disposed in front of the panel 30.

In making human chest radiographs, the person 25 to be pictured may be placed in front of the panel 30, said panel being curved more particularly to facilitate the disposition of the chest portions of the person 25 in picturing position with respect to cassette enclosed ray sensitive material disposed immediately behind the panel 30. Obviously, the panel 30 could be omitted, but is preferred in order to aid in placing the picture subject 25 in desired position and to maintain said subject substantially immovably in such position during the picturing operation, the same being accomplished by pressing the chest portions of the subject 25 upon the panel 30 and, if necessary, strapping the subject in place upon the panel.

Suitable means may be provided for supporting the casing 28 at a desired elevation to suit the configuration of a partciular subject to be pictured. To this end, the housing may be mounted upon a suitable support frame 32 comprising a pair of spaced apart uprights 32', on and between which the casing 28 is supported for adjustable vertical movement in response to operation of a hand crank 33 or other suitable means for shifting the housing vertically on the frame 32, said frame being supported upon a suitable support base or otherwise mounted or suspended in upright position, as on the wall of a building in which the equipment is installed.

In order to allow for the removable disposition of cassette enclosed ray sensitive material in position to be exposed within the housing 28 and immediately behind the panel 30, the opposite side walls 26 of the casing may be provided with elongated slot-like openings 34, adjacent the forward edges of said side walls and through which openings cassettes containing ray sensitive material may be introduced into holder means 35 for supporting the same in material exposing position. The holder means 35 may comprise a carrier frame forming a pair of spaced apart flat cassette receiving pockets 36 and 36', said pockets being open at the opposite sides of the carrier and normally disposed in alined registration with the openings 34 for the removable reception of cassettes in the pockets 36 and 36'. The carrier may also include sheets 37 of material, such as lead, impervious to X-rays, said sheets being disposed in postion covering the mutually facing sides of the spaced cassette pockets 36 and 36'.

It will be seen that cassettes containing ray sensitive sheet material may be easily mounted upon the carrier 35 by inserting the same into the pockets 36 and 36' through the openings 34, when the carrier is in position with its opposed sides in alinement with the said openings 34. It will be seen also that, when the carrier is in cassette receiving position, one of the mounted cassettes, such as the cassette in the pocket 36, will be in position immediately behind and facing toward the panel 30, that is to say, in position to be exposed to picturing rays directed from a suitable ray source S mounted in spaced relation opposite and in front of the panel 30. At such time the cassette in the other pocket 36' will be in position facing away from the front panel 30 and will be protected against ray exposure by the lead layers 37.

Means is provided for shifting the carrier 35 in order to present cassettes in the pockets 36 and 36' successively in exposable position behind and facing the panel 30. To this end, means forming a trackway 38 is secured within the casing and preferably upon the bottom wall 27' thereof in position extending between the opposite side walls 26 at the lower ends of the openings 34, a similar trackway, if desired, being secured to the upper wall 27 in position extending between the upper ends of the openings 34, whereby said ways are mounted in facing, parallel and spaced relation within the casing 28. The carrier frame 35 may be formed with pivot means 39 defining an axis adjacent one end of the frame and about which axis the frame may turn, said pivot means including a roller guide member received within the lower trackway 38 for movement longitudinally thereof. A similar roller guide member may be provided, if desired, for movement along the trackway at the top of the casing.

Mechanism is provided within the casing 28 for rapidly reversing the position of the carriage 35. Such mechanism may comprise an arm 40 pivoted as at 40' on one side of the casing 28, the arm 40 being preferably fastened upon a vertical shaft comprising the pivot 40' suitably journaled at or adjacent its opposite ends in suitable spaced bearings mounted within the casing 28. The end of the arm 40 remote from the pivot 40' is turnably connected with the carrier 35 intermediate the opposite sides thereof, the connection preferably comprising an axle member 41 secured on the carriage preferably at the lower edge thereof, said member being journaled in the arm 40. If desired, another axle member may be mounted at the upper edge of the carriage and received in an arm similar to the arm 40 and fastened upon the vertical shaft forming the pivot 40'.

By rocking the arm 40 in a clockwise direction about the pivot 40', when the carriage 35 is in position with its pocket 36 disposed adjacent and immediately behind the panel 30, the medial portions of the carriage will swing about the pivot 39, in a counterclockwise direction, and the pivot, simultaneously, will be drawn toward the right, viewing Fig. 2, thereby imparting a turning movement to the carriage 35 which will result in moving the pivot 39 from the left hand side of the casing to its right hand side. When the pivot means reaches the right hand end of the trackway 38, the carriage will have turned into position presenting the cassette pocket 36' immediately behind the panel 30 in position for exposure of sensitive material in a cassette mounted in said pocket 36'. During the initial half of carriage turning movement, the arm 40 will move from its starting position, in a clockwise direction about the pivot 40', and thereafter will return to its initial or starting position in a counterclockwise direction during the terminal half of carriage turning movement. Rocking movement of the arm 40 from and return thereof to starting position when the pivot 39 is at the right hand end of the trackway 38, viewing Fig. 2, will move the pivot to the opposite end of the trackway and correspondingly rotate the carriage 35.

In order to rock the arm 40, a crank 42, drivingly connected with a motor 43 as through reduction gears 44, may be provided, and the crank 42 may be drivingly connected with the rocking arm 40, as by means of a connecting rod 45. By rotating the crank 42 through one complete revolution, the arm 40 will first be rocked in a clockwise direction until the position shown in Fig. 2 is reached, after which continued movement of the crank will cause the arm 40 to be returned to its normal or stand-by position.

In order to control the operation of the motor 43, a control disk 46 of generally circular configuration having a flat edge portion 46' may be drivingly connected for movement with the crank 42, a pair of normally open switches 48 and 48' being provided in association with the control disk. When the arm 40 and crank 42 are in stand-by position the control disk permits the switches 48 and 48' to assume open position. The switches, however, will be closed by the disk 46 as soon as it is turned from stand-by position with the crank 42. The switches will remain closed until the disk again reaches stand-by position after having turned through one complete revolution. The motor 43 may be energized from a suitable power source 49 under the control of a push button switch 50 and a normally closed relay switch 51 having an associated operating coil 51' adapted to open the switch 51 when energized. As soon as the motor starts in operation, upon closure of the switch 50, it will drive the crank 40 and will thus initiate carriage reversing movement.

At the same time, the control disk 46 will turn with the crank 42, thus causing closure of the normally open switches 48 and 48'. Upon closure of the switch 48, the switches 50 and 51 will be short circuited, thus connecting the motor 43 directly with the power source and insuring continued operation of the motor until the switch 48 opens at the conclusion of the operating cycle of the cassette changer; when the flat edge 46' of the operating disk allows the switches 48 and 48' to open. Upon closure of the switch 48', the relay coil 51' will be connected with the power source 49 and will be and remain energized to hold its associated switch 51 open until the switch 48' opens at the conclusion of the operating cycle of the cassette changer. The push button switch 50 will thus be disconnected from controlling relationship with the motor 43 during the operating cycle of the cassette changing apparatus.

The exposure of cassette enclosed sensitive material, of course, may be made in accordance with usual radiographic techniques, by disposing the source of X-rays S at a predetermined distance directly in front of and in line with the panel 30, so that rays from the source may penetrate the patient and impinge upon the sensitive cassette enclosed material presented in position immediately behind the panel 30. As soon as the sensitive material in the cassette mounted in, say, the carriage pocket 36 shall have been exposed, the carriage 35 may be shifted to present the material in the cassette mounted in the pocket 36' in exposable position, while the position of the picture subject 25 being photographed is maintained unchanged, so that a second picture may be made of the subject promptly after exposure of the first picture.

The ray sensitive unit 21 is preferably of relatively flat configuration and hence adapted to be incorporated in the carriage 35, in the space therein between the cassette pockets 36 and 36' thereof, the unit being secured in the upper portions of the carriage, preferably in centered position, between the opposite sides thereof. Portions of the lead layers 37 may be omitted directly opposite the unit 21, whereby the same will be in position to detect and measure X-rays applied to and through a cassette in each of the pockets 36 and 36', and the sensitive material enclosed therein.

The unit 21 may comprise means forming a shallow, generally rectangular housing 52 having peripheral walls including a top wall 53, opposed side walls 54 and a bottom wall 55, said housing being preferably open on its front and back sides and having an extension 56 formed on and medially of its bottom wall. The extension 56 provides a chamber 57, which is preferably open on both sides, and adapted to receive and enclose a light sensitive phototube 58 in position with the light responsive portions of the phototube in alinement with a port 59 formed centrally in the housing wall 55 and serving to interconnect the chamber 57 with the interior of the housing 52. The lower portions of the housing 52, including the chamber forming extension 56, may be closed, on the opposite sides thereof, by removable cover plates 60 and 60' secured in place as by fastening screws 61. If desired, the cover plates 60 and 60' may be lined with lead or other ray impervious material. The upper portions of the housing 52 may also be enclosed, on the opposite sides of the housing, by sheets 62 and 62' of ray transparent material, which, however, are opaque to visible light rays, whereby to render the interior of the housing 52 and the chamber 57 substantially light tight. The sheets 62 and 62' may extend in position overlying the upper portions of the opposite side walls 54, between the top wall 53, and the upper edge of the cover plates 60 and 60', the ray transparent, light opaque plates 62 and 62' being secured at their marginal edges upon the side and top walls of the housing frame 52, as by screws 63, and being secured, as by fastening screws 63', to bar members 64 and 64', said bar members 64 and 64', respectively, being secured along their lower edges to the upper edges of the cover plates 60 and 60'.

Two different kinds of X-ray pictures of the human chest are commonly made. One type of chest radiograph may be termed a "posterior-anterior" picture, the same having reference to pictures made by passing a picturing ray through the picture subject, from back to front, or vice versa, and thence upon the sensitive sheet of picturing material. The other type of chest radiograph may be termed a "lateral" picture, such term defining pictures made by directing picturing rays through the person to be pictured, from one side to the other, and thence upon the sensitive picturing material. In measuring ray quanta, delivered through the picture tube during an exposure interval, it is desirable to scan an area of the picture subject that is of maximum radiographic interest. The location and size of the scan areas are determined with the object of scanning only lung fields and excluding heavy muscle (heart) or bone tissue. In making posterior-anterior chest radiographs, the most desirable scanning areas are the center lung areas, indicated by dashed line rectangles 65 in Fig. 4 of the drawings. In making lateral chest radiographs, the most desirable scanning area is the mid-lung zone depicted as a dashed line rectangle 66 in Fig. 5. Accordingly, the unit 21 contains a pair of ray sensitive scanning elements 65' mounted in the upper portions of the frame 52 in spaced apart relationship immediately within and beneath the upper frame wall 53, in position to register with the desired posterior-anterior scanning areas 65 of a person disposed in picturing position at the panel 30. The unit also contains a scanning element 66' mounted in the upper portions of the frame 52, between the elements 65', and offset downwardly thereof, in the frame, in position to register with the desired lateral scanning area 66 of a person disposed in picturing position at the panel 30.

It will be seen thus that penetrating rays from the source S may be applied through the closure sheets 62 or 62' on the opposite sides of the housing and hence caused to impinge upon the detector elements 65' or 66' enclosed within the housing. In order to allow rays to thus impinge upon the detector elements, the lead layers 37 may be formed with window openings therein opposite the cover layers 62 and 62' of the detector unit. Means 67 may also be provided for selectively screening the detecting elements 65' and the detecting element 66' from rays applied to the unit from one side or the other thereof. The means 67 may also serve to screen the side of the unit which faces away from the ray source, behind whichever of the elements 65' or 66' is exposed or uncovered, on the opposite side of the unit, for X-ray impingement thereon. As a consequence, regardless of which of the elements 65' or 66' is exposed for X-ray impingement on the ray source facing side of the unit, impinging rays may not pass outwardly of the back or ray source remote side of the unit and into the cassette chamber, which at such time is disposed behind the unit.

In order to thus selectively screen and expose the elements 65' and 66', selectively operable shutters may be mounted in position overlying the ray transparent cover sheet portions 62 and 62' on each of the opposite sides of the housing 52. The shutters may comprise a pair of cooperating plates 68 and 69 mounted on one side of the housing in position overlying the cover sheet 62, and a corresponding pair of plates 68' and 69' in position overlying the closure sheet 62' on the opposite side of the housing. The plates 68, 68', 69 and 69' may comprise ray opaque material such as lead and are preferably of rectangular configuration, having lower edges formed for slidingly guided movement in edge receiving notches 70 formed in the bars 64 and 64'.

At their upper ends the shutter plates may be formed for connection with plate shifting means 71 preferably comprising a channel member 72 forming a mounting frame adapted for attachment, as in readily demountable fashion, upon the top wall 53 of the housing 52, the channel member 72 being secured on the housing 52 as by fastening screws 73 adapted to penetrate the bottom of the channel member 72 and to take into threaded sockets 74 formed in the wall 53 for for the reception of the fastening screws 73.

The channel member 72 forms a pair of spaced apart walls 75 and 75' lying substantially in common planes with the cover sheets 62 and 62'. The upper edges of the walls 75 and 75' may be flanged outwardly to provide lips for receiving and supporting the opposite ends of a transverse strap 76 at one end of the channel member 72, said strap forming a mounting for a support stem upon which is carried a chain sprocket 77 within one end of the channel. A motor 78 for shifting the shutters may also be mounted upon the channel member 72 as by motor supported pedestals fastened to said outstanding flanged lips at the upper edges of the channel walls 75 and 75'. The motor 78 is thus mounted in position with its drive shaft extending within the space between the walls of the channel member 72. The motor shaft may be fitted with a chain driving sprocket 77' in spaced relationship with respect to the sprocket 77, an endless chain 79 being mounted on the sprockets.

The shutter plates 68 and 68' may be formed with laterally extending bars 80, and the plates 69 and 69' may be formed with similar laterally extending bars 80', said bars projecting outwardly of the plates at the upper edges thereof. The walls 75 and 75' are provided with elongated registering slots 81 and 81' in the upper portions thereof, and registering slots 82 and 82' are formed in the walls 75 and 75' beneath the slots 81 and 81'. The upper ends of the plates 68 and 68', including the bars 80, extend in position overlying the slots 81 and 81'. The upper end portions of the plates 69 and 69' likewise extend in position overlying the slots 82 and 82'. The upper ends of the plates 68 and 68' may be fastened together by means of pins 83 and 83' which extend through the alined slots 81 and 81'. The plates 69 and 69' likewise may be fastened together at their upper ends by means of pins 84 and 84' which extend through the alined slots 82 and 82'. The plates 68' and 69' are inverted with respect to the plates 68 and 69, that is to say, the fastening pins 83 and 84 respectively interconnect the plate remote ends of the projecting arms of the plates 68 and 69 with the arm remote upper corners of the plates 68' and 69', while the pins 83' and 84' connect the plate remote ends of the arms of the plates 68' and 69' with the arm remote upper corners of the plates 68 and 69. Accordingly the plates 68 and 69, respectively, are always disposed opposite the projecting arms of the plates 68' and 69', and vice versa. As a consequence, when the plates 68 and 69 are spread apart as shown in Fig. 6, on one side of the unit, the plates 68' and 69' will be in centered overlying position as shown in Fig. 7 of the drawings on the opposite side of the unit. Conversely, when the plates 68' and 69' are spread apart, on one side of the unit, to positions comparable to those occupied by the plates 68 and 69 in Fig. 6, said plates 68 and 69, on the opposite side of the unit, will be disposed in overlying registration and will occupy positions comparable to those of the plates 68' and 69' in Fig. 7.

In order to allow the motor 78 to move the plates, the pins 83 and 84' may be drivingly connected respectively with opposite sides of the chain 79. Accordingly, when the motor 78 is driven in one direction the plates 68 and 69 may be spread apart and the plates 68' and 69' simultaneously may be drawn together, and vice versa when the motor is driven in the opposite direction. In order to limit the movement of the plates precisely, the stems 83' and 84 may be fitted with adjustable stop screws 85 in position to engage cooperating stop means mounted in the channel member 72 to limit the driven movement of the shutter plates in both directions, a non-positive drive clutch being preferably connected between the motor 78 and the chain driving sprocket 77'.

In order to control the operation of the motor 78 automatically, a pair of normally closed micro-switches 86 may be mounted on a suitable bracket 87 fastened on the channel member 72 at an end thereof, means being provided for opening one of the switches as the plates 68 and 69 reach spread apart position on one side of the unit, and to open the other of said switches when the plates 68' and 69' likewise reach spread apart position on the opposite side of the unit. The switches 86 may be connected respectively in the forward and reverse driving motor circuits. The switches 86 also may be connected with a double-pole double-throw reversing switch 87 mounted on the cassette carriage 35 and actuated by a switch throwing cam on the housing 28, so that the switch 87 may be moved from one to the other of its two positions each time the carriage 35 is reversed by operation of the cassette changing mechanism. Of course, any other suitable or preferred means may be employed for reversing the position of the shutters 67 each time the cassette carriage 35 is inverted for cassette changing purposes. Such automatic means for changing the shutter plates is desirable to permit the making of sucessive exposures rapidly in lateral or posterior-anterior lung radiography.

It will be apparent, of course, that the detector unit, when the plates are separated on the side of the unit facing toward the ray source, will be conditioned to scan for lateral radiography, and will be conditioned to scan for posterior-anterior radiography when the plates are disposed in superposed registration medially of the unit. A manually operable reversing switch 88 may also be interconnected with the automatic reversing switch 87 in order to allow the shutters to be adjusted at will from one scanning position to the other, whereby to condition the unit either for lateral or for posterior-anterior radiographic scanning.

Under normal operating conditions, one of switches 86 will be held open by the shutter plates, in shifted position, thereby breaking the motor circuit which is otherwise closed at the switches 87 and 88. The other switch 86, although closed, at such time, is connected in a circuit that is broken at the switch 88. Accordingly, when the switch 88 is thrown, it will complete the circuit through the closed switch 86 and thereby operate the motor 78 to shift the shutters, which, incidentally, will open the closed switch 86 at the conclusion of the shutter shifting operation. In the event of operation of the cassette carriage, the switch 87 will be thrown, thereby completing a circuit through the closed switch 86 in order to shift the shutters and, incidentally, open the closed switch 86 at the conclusion of shutter shifting movement. The shutters 67, accordingly, may be conditioned at will for either lateral or posterior-anterior scanning purposes merely by operation of the selector switch 88. The desired scanning condition, as determined by the setting of the switch 88, will be maintained by causing the shutters to be shifted each time the position of the cassette carriage 35 is inverted.

The ray sensitive detector elements 65' and 66' are adapted to receive exciting rays which penetrate from one side or the other of the unit. Furthermore, the unit is preferably of relatively flat configuration. The elements 65' and 66' accordingly are arranged to emit light, generated therein as the result of ray excitation thereof, in a direction transversely of the direction of ray impingement upon the ray sensitive elements. It will also be understood that the ray sensitive elements in the interests of accuracy should be arranged to produce the same response, in terms of light emission therefrom, regardless of the side thereof upon which ray impingement occurs. Accordingly, the ray responsive elements 65' and 66' each comprise a pair of mutually inclined plates or sheets of ray responsive fluorescent material adapted to emit light in amount precisely proportional to the intensity or quality of X-rays impinging thereon. The elements 65' each comprise a pair of plates 89 of identical size, which conveniently may be of rectangular configuration. The element 66' likewise comprises a pair of rectangular plates 89' of identical size. The plates 89' of the element 66' are of somewhat greater area than the plates 89 of the elements 65' in order to accommodate the lateral radiographic scanning zone 66 which is somewhat larger in area than the posterior-anterior zones 65.

The plates 89 of the elements 65' and the plates 89' of the element 66' are secured together in any suitable or preferred fashion, as by means of binding tape applied along the edges 90 of the plates at one end of each element. The opposite edges of the plates of each element are mounted in spaced apart relationship so that the plates are mutually inclined from the bound edges 90 thereof, said spaced edges of the plates forming an opening through which light emitted by the plates under ray excitation may be delivered outwardly of the element. to support the plates in the desired mutually inclined relationship, their opposite side edges may be received in mutually inclined grooves 91 formed in blocks of material 92 which provide sides for the elements 65' and 66'. The blocks 92 may be fitted within preferably lead lined channel members 93 which may be secured together and to the side and top walls of the housing frame 54 as by means of fastening screws, in the manner clearly illustrated in Fig. 11.

In order to measure precisely the amount of light emitted by the elements 65' and 66', suitable means may be provided for applying it upon the light sensitive detector 58 in the chamber 57. In this connection it should be understood that, during transverse radiography, only the unit 66' will be in operation for the production of light in response to impinging rays. Conversely, during posterior-anterior radiography, both of the units 65' will be in operation. In the interests of precise measurement, it is necessary to provide means for transmitting the light emitted by both of the elements 65' so that such light will be applied equally upon the detector 58. While any suitable or preferred light transmitting means may be utilized, including arrangements of mirrors for receiving light emitted by the elements 65' and 66' and for reflectingly relaying the same for application upon the detector 58, the present invention particularly contemplates the provision of an optical light transmitting system comprising pieces of light conveying material shaped to provide light conducting pathways from the open or light delivery ends of the elements 65' and 66' to the detector 58.

The members or pieces constituting the optical transmitting system, if desired, may be made of glass although, in the interests of cost economy, acrylic plastic, such as Lucite, and other light transmitting plastic materials may be and preferably are employed to form a light receiving, retaining and transmitting system adapted to accept light from the elements 65' and 66' and preserve it against dissipation or dispersal while transmitting and applying the same to and upon the detector 58. To this end, the light receiving and transmitting system may comprise light receiving blocks or lens elements 94 and 94' adapted to be placed respectively opposite the light emitting ends of the elements 65' and 66'. The blocks 94 and 94' are preferably of relatively flat, plate-like configuration having opposite faces 95 inclined mutually inwardly, from an end edge 96 of the block toward the opposite end edge 97 thereof. Each block, also, preferably has lateral edges 98 inclined mutually inwardly, away from the end edge 96 toward the opposite end edge 97 of the block.

The end edge 96 of each block is preferably spherically curved convexly about centers located substantially midway between the opposite ends of the block, the curvature way between the opposite ends of the block, the curvature of the end edge 96 in the direction normal to the faces 95 being preferably on a radius somewhat less than the radius of curvature of the surface 96 in the direction normal to the side edges 98, the ratio of said radii being of the order of four to five. The end 97 of each block is also preferably spherically curved concavely on radii having a ratio of the order of five to eight, the curvature, in a direction normal to the faces 95, being of lesser radius than that of the curvature in a direction normal to edges 98. The elements 94 and 94' may each be formed with integral side flanges 99 provided with openings 100 therethrough for the reception of anchoring bolts 101 for securing the same, in mounted position, in the frame 52, with the curved edge 96 of each element disposed opposite and in facing relationship with respect to the open end of the light sensitive element 65' or 66' with which it is associated.

The member 94, which is mounted to receive light from the element 66', may be operatively associated with a generally rectangular block of light transmitting material 102, said block extending between the surface 97 of the member 94 and the channel 59. The block 102 has an end edge surface adapted to extend in juxtaposed facing relationship with respect to the surface 97 of the member 94 and an opposite end edge surface adapted to extend in the opening 59 in spaced facing relationship with respect to the detector element 58. As a consequence, light emitted by the element 66' may be delivered into the block 94 through the curved surface 96 thereof and transmitted thence through the surface 97 and into and through the transfer block 102 for delivery thence directly upon the detector element 58, the side surfaces 95 and 98 of the member 94 and the side surfaces of the block 102 acting substantially as mirrors to prevent the escape of light laterally therefrom, whereby to deliver substantially all of the light emitted by the element 66' into the chamber 57 and upon the light detector 58, the interior surfaces of the chamber 57, to this end, being preferably coated with light reflecting material, such as white paint or enamel.

The end edges of the side flanges 99 of each element 94', on opposite sides of the spherically curved surface 97, may be formed with dowel openings 103 to receive pins 104 formed in associated light transmitting elements 105 of generally identical configuration. These elements 105 are provided for transmitting light from each of the elements 94' and delivering the same through the opening 59 into the chamber 57 for application upon the light sensitive detector 58. To these ends, the members 105 each provide a light receiving surface 106 formed between the dowel pins 104 in position to be disposed in closely juxtaposed facing relationship with respect to the surface 97 of the associated member 94', when the pins 104 are snugly seated in the openings 103. Each of the members 105, adjacent the base of the pins 104, may be provided with openings 107 for the reception of fastening screws 108 for anchoring the members 105 within the housing 52.

Light rays transmitted from each member 94' into its associated transfer member 105 may pass to a reflecting surface 109, formed in the member, and thence in succession to reflecting surfaces 110, 111 and 112, for delivery from the member 105 through an inclined exit surface 113.

It will be seen that the transfer members 105 have relatively offset light receiving and light delivering portions so that the light receiving surfaces 106 may be disposed in co-planar registration opposite the light emitting ends 97 of the members 94' while the light delivery ends 113 of the members 105 may be disposed on opposite sides of the light delivering block 102 which is associated with the lens element 94. The inclination of the light emitting surfaces 113 is for the purpose of refracting light, emitted at said ends, convergingly inwardly upon the light sensitive element of the detector 58, more particularly as shown in Fig. 14 of the drawings.

It will be seen that the light transmitting optical system is substantially identical for transmitting light emitted from both of the ray sensitive elements 65'; that the side surfaces 95 and 98 of the members 94' as well as the bounding side surfaces of the transfer members 105 will operate substantially as reflecting surfaces to prevent the escape of light laterally outwardly of said members. As a consequence, substantially all of the light produced by ray excitation of the members 65' will be transmitted, at substantially identical efficiency, through the members 94' and 105 and delivered thence upon the detector 58.

The detector 58 preferably comprises a photoelectric tube device of the sort disclosed in Letters Patent of the United States No. 2,231,697 of February 11, 1941, covering the joint invention of Vladimir K. Zworykin and Richard L. Snyder, Jr., such tube having an anode 115, a light sensitive cathode 116, and a plurality of so-called dynode electrodes 117, including an end dynode 117'. The several operating elements of the phototube detector 58 may be electrically connected in an external translation system 118, as through connection terminal means 119 mounted on the housing 52. The translation system 118 is preferably of the sort adapted to integrate the response of the phototube detector in order thus to measure ray quanta applied upon the detector element 66' or upon the elements 65', and also to actuate a load device such as a relay switch to control any operable equipment desired to be operated in accordance with the ray excitation of the detector elements 65' or 66'.

To this end, the system 118 may comprise current integrating and relay actuating means of the sort shown in the aforesaid Letters Patent of the United States No. 2,401,289, or improved systems of the sort illustrated and described in copending applications for United States Letters Patent on the invention of Robert A. Arrison Jr. in Means For and Method of Interval Timing, Serial No. 364,697, filed June 29, 1953, and the inventions of Robert Godbarsen Jr. in Interval Timing Apparatus and Method, Serial No. 367,937, filed July 14, 1953, now U.S. Patent 2,909,666, issued October 20, 1959, and in Switching System, Serial No. 367,947, filed July 14, 1953, now U.S. Patent 2,809,296.

As shown in Fig. 20, the X-ray tube forming the ray source S may be caused to operate for the generation of X-rays by energizing its cathode 120 for electron emission as by connecting the cathode conductors 121 with a suitable source of cathode energizing power, while simultaneously applying an electron driving potential between the cathode 120 and the anode 122 of the tube as by connecting one of the cathode conductors 121 and the anode conductor 123 with a suitable source of electron driving power disposed outwardly of the envelope 124 of the X-ray tube.

Electrons emitted by the cathode 120 may travel thence as a beam, under the influence of the electron driving potential, and may impinge upon the facing target surface of the anode 122, thereby constituting the same as an X-ray source from which rays may be emitted outwardly of the envelope in the form of a ray beam 125 in a direction to traverse the body or picture subject 25, a layer of picturing material 126 enclosed in a cassette 127 and the sensitive units 65' or 66'. To thus energize the X-ray tube, for X-ray emission, its anode conductor 123 and one of the cathode conductors 121 may be connected with the secondary winding 128 of a step-up transformer, either directly, if the generator is to be operated as a self-rectifying device, or through a rectifying system R, where it is desired to utilize full wave rectified power for the operation of the generator. The primary winding 129 of the step-up transformer may in turn be connected with the principal secondary winding 130 of a power transformer having an auxiliary secondary winding 131 and a primary winding 132 connected with a suitable power source 133, preferably through a disconnecting switch 134. Means such as an adjustable connection 135 with the secondary winding 130 may be and preferably is provided for adjustably carrying the potential applied between the anode and cathode of the X-ray tube. To energize the cathode of the tube for electron emission, the conductors 121 may be connected with the transformer winding 131, preferably through an adjustable connection 136.

In order to start and stop the emission of X-rays, a control switch 137 may be interposed at any convenient location in the anode-cathode power supply system, the switch 137, as shown, being preferably connected in the power supply circuit to the primary transformer winding 129. The switch 137 may comprise a normally open relay switch adapted to be and to remain closed when and so long as an associated relay coil 138 is energized, as from the power source 133. Accordingly, upon closure of the switch 137, the X-ray source S will be operated for the production of X-rays, the quanta value of which will be measured in terms of light generated in and emitted by the sensitive elements 65' or 66', and applied thence through the optical light transmitting system upon the phototube detector 58, the tube 58, in turn, being interconnected in the translation system 118 to cause the same to actuate a load device 139 for the discontinuation of X-ray emission by the source S at the desired conclusion of an exposure interval.

To these ends the translation system 118 may embody a thyratron tube 140, the same comprising a gas filled electron flow device having a cathode 141, an anode 142, and a control grid 143. The anode and cathode of the thyratron tube 140 may be interconnected in an output circuit including a suitable power source 144 and the load device 139, which, in the illustrated embodiment, comprises a switch operating coil 145 and a normally closed relay switch 146 adapted to be opened when the coil 145 is energized. The control grid 143 of the thyratron tube may be connected in a control circuit with which the detector tube 58 is also operatively associated; and means may be provided for electrically energizing the grid 143 for the control of the thyratron in accordance with total aggregate current caused to flow in the detector 58 during a ray exposure interval being measured. Accordingly, the end dynode 117' of the phototube may be connected with the grid of the thyratron tube through a conductor 147.

The grid control circuit may also include direct current power source means for applying electrical potential at suitable voltage values upon the anode, the dynodes, and the cathode of the phototube. An adjustable resistance 148 is also preferably interconnected in the cathode circuit of the detector tube as a sensitivity control. The control circuit may also include an integrating condenser 149 connected between the cathode and the grid of the thyratron tube 140, as well as a suitable power source 150 of negative potential value for thyratron grid biasing purposes.

The thyratron tube 140 comprises a triggering device adapted to become conducting between its anode and cathode, for the operation of the load device 139, from the power source 144, whenever the voltage applied between the grid and cathode of the thyratron reaches a predetermined value, such as, say, two volts of negative bias potential on the grid 143 with respect to the cathode 141. So long as the negative potential on the grid of the thyratron remains greater than two volts, the thyratron will remain in inactive non-conducting condition. The control circuit may also include a normally closed disabling switch 151, connected in parallel with the integrating condenser 149, and a normally open anode circuit switch 155, connected between the anode 142 of the thyratron tube and ground in series with the power source 144 and the relay coil 145, the cathode of the thyratron tube being grounded, as shown, and hence connected with the grounded side of the power source 144. So long as the anode circuit switch 155 remains open, the thyratron tube 140 will remain inactive because its anode circuit will be open at the switch 155. Furthermore, while and as long as the disabling switch 151 is in closed position, a negative bias of potential substantially in excess of that at which the thyratron may fire will be applied directly upon the grid 143, from the source of biasing potential 150. The condenser 149, of course, will remain inactive so long as the same is short circuited by the switch 151, the grid connected side of the condenser being maintained at a potential with respect to the cathode of the thyratron equal to the negative potential maintained upon the grid when the disabling switch is closed.

Means is provided for opening the disabling switch 151 coincidentally with the closure of the switch 137 at the start of an exposure interval. When the switch 151 thus opens and switch 155 simultaneously closes, the thyratron will continue to be inactive because biased beyond cut-off. In this connection, the condenser 149 will have no charge in it, so far as the grid of the thyratron is concerned, but its grid connected side will be at a negative potential, with respect to the cathode 141, as supplied by the power source 150. As electrical current is delivered through the conductor 147 as the result of ray excitation of the detector elements 65' or 66', the grid connected side of the condenser 149 will progressively lose negative electrons, thereby becoming positively charged in progressively increasing fashion. The opposite side of the condenser, of course, being connected with the power source 150 will be held at a voltage level determined by said source. After an interval determined by the amount of the condenser charging current flow, the capacity of the condenser 149, and the value of bias voltage supplied by the power source 150, the difference of potential between the control grid 143 and the cathode 141 of the thyratron will decrease to the bias voltage level at which the thyratron may fire. When the thyratron tube is thus fired or placed in operation, it will energize the relay coil 145 and cause the switch 146 to open. After being triggered, the thyratron tube 140 will continued in operation until the switch 151 is reclosed and the switch 155 reopened.

Any preferred means may, of course, be employed for utilizing the foregoing operation of the thyratron. As shown in Fig. 20, however, such control may be accomplished by providing a relay 152 having an actuating coil 153, a normally open switch 154, the normally open switch 155, and the normally closed disabling switch 151. The coil 153 may be connected with the power source 133, in series with and hence under the control of a normally open control switch 156, preferably of the manually operable push-button type. The normally open switch 154 may also be connected in series with the normally closed relay switch 146 and the operating coil 138 of the normally open switch 137, to form a series circuit connected with the power source 133. The normally open switch 155 may be interconnected in the plate circuit of the thyratron, in series with the power source 144 and the operating coil 145 of the load device 139.

The X-ray source S thus may be placed in operation for the emission of the ray beam 125 and for the application thereof to the body 25, the cassette enclosed sensitive picturing material 126 and the ray responsive detector elements 65' or 66', by manual closure of the switch 156. Closure of said switch energizes the relay coil 153 to thereby open the disabling switch 151 and to close the switches 154 and 155. Closure of the switch 155 will complete a relay energizing circuit through the switch 146 and the operating coil 138 to thereby cause closure of the normally open ray source controlling switch 137 and thus start the ray source in operation for the emission of the ray beam 125. Thereafter the ray source will remain in ray emitting condition during an exposure intervals during which a required quanta of rays shall have been applied to the body 25, as determined by the detector unit 58 actuated by light emitted from the ray sensitive means 65' or 66'. Thereupon the thyratron tube 140 will be caused to fire as the result of the integrating action of the condenser 149 and the current releasing action of the detector 58. When the thyratron is thus actuated, it will complete an operating circuit through the switch 155, which at such time is in closed condition, in order thus to energize the coil 145 and thereby open the energizing circuit of the coil 138, at the switch 146. When the coil 138 is thus deenergized, its associated relay switch 137 will open, thereby disabling the X-ray source and causing ray emission therefrom to cease to thereby terminate the exposure interval. Sensitive panel, screen or layer means 89 or 89' for use in timing exposure intervals of duration of the order of more than 0.1 second may comprise any suitable ray responsive fluorescent material, such as zinc sulfide. Ordinary fluorescent materials, however, have image decay time constant charcteristics causing image persistance in the sensitive material after the extinction or termination of exciting rays, such image persistence being of sufficient duration, in ordinary fluorescent materials, to result in erroneous operation of the integrating system, where the interval being measured is short, especially where the exciting rays pulsate at a selected frequency, such as a frequency of sixty cycles per second, as is the case where X-rays are produced by a generator actuated as a self-rectifying device by application of anode-cathode potential of character alternating at a frequency of sixty cycles. Where the generator is actuated by rectified sixty cycle alternating power, the resulting rays are emitted as pulsations at a frequency of 120 cycles. In either case the emitted rays comprise a wave consisting of successive ray pulses and inter-pulse intervals during which the emitted rays are entirely extinguished.

Due to image persisting characteristics of the ray sensitive material, excitation thereof and consequent light production and emission by the elements 65' and 66' will result in application of light upon the detector tube 58 during at least the initial portions of inter-pulse intervals while X-ray emission from the tube is blocked. The relatively slow decay time constant of ordinary fluorescent materials thus will result in the delivery of more current from the detector tube 58 than would occur if light emission from the material of the layers 89 and 89' were precisely responsive to X-ray incidence upon the material. Accordingly, where the interval being measured comprises an extended period of sufficient length to include several successive cycles of generator actuating power, the integrating errors, caused by slow decay time constant characteristics of the ray sensitive material can be compensated for by adjusting the bias supplied on the thyratron from the power source 150, since the error, when measured over several cycles of generator energizing power, tends to become directly portional to the length of the measured interval.

Where, however, the exposure interval is of duration of the order of less than 0.1 second, equivalent to less than twelve pulses of rays produced by a tube energized by full wave rectified sixty cycle alternating current power, the error introduced as the result of slow image decay characteristics of the ray sensitive material becomes increasingly larger as the exposure time interval diminishes, such error increase being somewhat erratic and to some extent dependent upon the relative position of the instant of exposure interval termination in or with respect to the ray source energizing power cycle. Accordingly, where the ray sensitive unit is to be used in conjunction with equipment for measuring exposure intervals of duration of the order of 0.1 second or less, and particularly for ultra short exposure of the order of one-thirtieth second, the sensitive material of the layers 89 and 89' should comprise ray sensitive fluorescent material, such as calcium tungstate, having highest possible image decay speed characteristics, that is to say, material in which ray induced luminosity becomes extinguished as promptly as possible, as during an interval of the order of one-thousandth of a second, after the termination of ray impingement thereon.

It will be seen from the foregoing that the ray sensitive elements 65' and 66', when excited by ray impact thereon, will emit light at the open end of the elements into the optical system comprising the members 94 and 102 or the members 94' and 105, light being thus emitted from the elements 65' or 66' in a direction transversely of the direction of ray impact upon the detection unit. Since the detector tube 58 is housed in a light tight chamber, the equipment is unaffected by light conditions which may prevail in the location where the equipment is installed for operation. The phototube 58, furthermore, being enclosed in a light tight compartment embodying ray impervious material, is completely protected from possible damage due to overloading such as might be caused by accidental exposure to artificial or natural light conditions which may exist at the work station where the equipment is operated, or to excessive irradiation by X-rays. The sealed character of the unit 21 likewise protects against timing errors such as might be occasioned by the accumulation of dust, dirt, smear marks or other external physical impedimenta in the light path between the sensitive elements 65' or 66' and the phototube 58.

It is thought that the invention and its numerous attendant advantages will be fully understood from the foregoing description, and it is obvious that numerous changes may be made in the form, construction and arrangement of the several parts of the ray sensitive screen and associated apparatus without departing from the spirit or scope of the invention, or sacrificing any of its attendant advantages, the form herein disclosed being a preferred embodiment for the purpose of demonstrating the invention.

The invention is hereby claimed as follows:

1. Apparatus for detecting penetrating rays, such as X-rays, comprising a plurality of ray sensitive light emitting elements mounted in position to be disposed in a beam of rays to be detected, common light receiving target means for receiving the light emitted by said elements when excited for light emission and means for selectively screening said elements against ray impingement.

2. Apparatus for detecting penetrating rays, such as X-rays, comprising a relatively flat light tight housing having a pair of spaced apart opposed walls of ray pervious material, a ray sensitive light emitting element disposed between said opposed walls in position to be excited by rays forming a ray beam applied thereto through either of said walls, said element being formed to direct the light emitted therefrom between said walls in a direction transversely of the exciting beam, and target means for receiving said light.

3. Apparatus for detecting penetrating rays, such as X-rays, comprising a plurality of ray sensitive light emitting elements mounted in position to be disposed in a ray beam to be detected, and shutters of ray impervious material shiftably mounted in front of said elements in position to selectively screen said elements from and to uncover the same to receive impingement of said rays.

4. Apparatus for detecting penetrating rays, such as X-rays, comprising a plurality of ray sensitive light emitting elements mounted in position to be disposed in a ray beam to be detected, and shutters of ray impervious material shiftably mounted in front of said elements in position to selectively screen said elements from and to uncover the same to receive impingement of said rays, and ray impervious screen means adjustable to screen the back of an element uncovered by said shutters to thereby prevent rays applied to said uncovered element from passing outwardly of the back thereof beyond said screen.

5. Apparatus for detecting penetrating rays, such as X-rays, comprising a ray sensitive element adapted to emit light for application upon a target when exposed in a beam of rays to be detected and an optical light transferring system comprising optical elements including a collecting lens element having a spheroidal light receiving surface disposed in position to receive light emitted by said element and a light conduction element mounted in position to receive light from the collecting lens element and to transfer and apply the same upon said target.

6. Apparatus for detecting penetrating rays, such as X-rays, comprising a ray sensitive element adapted to emit light for application upon a target when exposed in a beam of rays to be detected and an optical light transmitting system comprising a collecting lens having a convex light receiving surface at one end facing the light emitting portions of the ray sensitive element, said lens having mutually inwardly inclined lateral wall surfaces extending from said receiving surface toward the opposite end of the lens and a light delivery surface at said opposite end.

7. Apparatus for detecting penetrating rays such as X-rays, comprising a ray sensitive element adapted to emit light for application upon a target when exposed in a beam of rays to be detected and an optical light transmitting system comprising a collecting lens having a convex light receiving surface at one end facing the light emitting portions of the ray sensitive element, said lens having mutually inwardly inclined lateral wall surfaces extending from said receiving surface toward the opposite end of the lens and a concave light delivery surface at said opposite end.

8. Apparatus for detecting penetrating rays, such as X-rays, as set forth in claim 7 including a light transfer element comprising a bar of material having light receiving and delivering surfaces at its opposed ends and disposed respectively in facing relation with respect to the light delivering surface of said lens and the light receiving portions of said target.

9. Apparatus for detecting penetrating rays, such as X-rays comprising a ray sensitive element adapted to emit light when exposed in a beam of rays to be detected, a photosensitive detector forming a light target, optical light transmitting means for receiving light emitted by said element and applying the same upon said target, said target comprising a photoelectric tube adapted to control release of current proportional to the quanta of light impinging thereon, an integrating condenser connected with said photoelectric tube to measure current flow in terms of voltage across the condenser and a gas conduction electron flow valve controlled in accordance with condenser voltage.

10. Apparatus for detecting penetrating rays, such as X-rays, comprising a ray sensitive element having opposed ray receiving sides and adapted, when exposed in a beam of rays to be detected, to emit light for application upon an associated target, and means to mount the element for turning movement, whereby to present either of its sides toward the source of the beam of rays to be detected.

11. Apparatus for detecting penetrating rays, such as X-rays, comprising a ray sensitive element having opposed ray receiving sides and adapted, when exposed in a beam of rays to be detected, to emit light in a direction transversely of the ray beam for application upon an associated target, and means to mount the element for turning, movement, whereby to present its sides selectively toward the source of the beam of rays to be detected.

12. Apparatus for detecting penetrating rays, such as X-rays, as set forth in claim 6, including a light transfer element comprising a bar of material having light receiving and delivering surfaces at its opposed ends and disposed, respectively, in facing relation with respect to the light delivering surface of said lens and the light receiving portions of said target.

13. Apparatus for detecting penetrating rays, such as X-rays, comprising a mounting frame, a pair of spaced apart ray sensitive light emitting units mounted on said frame in position to be disposed in a ray beam in registration with upper lung scanning zones during frontal chest radiography, a medial ray sensitive light emitting unit supported on said frame between said spaced units in position to register with the mid-lung scanning zone during transverse chest radiography, and shutter means for selectively screening said medial and spaced units against ray impingement.

14. Apparatus for detecting penetrating rays, such as X-rays, as set forth in claim 13, wherein said units each have oppositely facing ray receiving sides including means for rotating said frame to present said units selectively in either normal or reversed position in the ray beam, and means operable to actuate said shutter means in response to rotation of said frame.

15. In radiographic apparatus embodying a cassette carriage adapted to receive a plurality of ray sensitive material containing cassettes, and means operable to move said carriage to present cassettes mounted therein successively in position for exposure of cassette enclosed ray sensitive material to a ray beam emitted from a ray source, the combination, with said carriage, of detecting means comprising a ray sensitive element adapted to emit light when exposed in a beam of rays to be detected, a photoelectric tube forming a light target, and optical light transmitting means for receiving light emitted by said element and applying the same upon said target, said detecting means being mounted on and shiftable with said carriage to present the same successively in position to be excited by rays applied to and through carriage mounted cassettes for the exposure of sensitive material therein to the action of said rays.

16. In radiographic apparatus embodying a cassette carriage adapted to receive a pair of ray sensitive material containing cassettes in back-to-back spaced relation, and means operable to invert said carriage in a ray beam emitted from a ray source, whereby to present cassette enclosed material successively in position to be exposed in said ray beam, the combination, with said carriage, of detecting means comprising a ray sensitive element having opposed ray receiving sides and adapted, when exposed in a beam of rays to be detected, to emit light for application upon an associated target, said detecting means being mounted in said carriage between a pair of carriage mounted cassettes, in position to be excited by rays applied successively through such cassettes in exposing sensitive material therein to said ray beam.

17. In radiographic apparatus embodying a cassette carriage adapted to receive a pair of ray sensitive material containing cassettes in back-to-back spaced relation, and means operable to invert said carriage in a ray beam emitted from a ray source, whereby to present cassette enclosed material successively in position to be exposed in said ray beam, the combination, with said carriage, of detecting means comprising a plurality of ray sensitive light emitting elements mounted, in said carriage, between a pair of carriage mounted cassettes, in position to be excited by rays applied successively through such cassettes in exposing sensitive material therein to said ray beam, shutters of ray impervious material shiftably mounted on opposite sides of said elements in position to selectively screen and uncover the elements on the front or ray source facing side thereof for ray impingement thereon while screening the back of an uncovered element to thereby prevent rays from passing outwardly of the back of such element, means operable to shift said shutters in response to carriage inversion, and manually operable means for shifting said shutters.

18. Apparatus for detecting penetrating rays, such as X-rays, comprising a pair of mutually inclined layers of ray sensitive light emitting material forming a ray sensitive detector element adapted to be disposed in and transversely of a ray beam to be detected, said layers having corresponding edges spaced apart at one end of the detector element to form a light emitting opening between said spaced edges, whereby light emitted at the facing surfaces of the layers may be directed transversely of the ray beam for application upon a light target disposed outwardly of the ray beam, and optical light transferring means embodying a light conduction element mounted in position to receive light at said opening and to transfer and apply the same upon said target.

19. Apparatus for detecting penetrating rays, such as X-rays, comprising a pair of mutually inclined layers of ray sensitive light emitting material forming a ray sensitive detector element adapted to be disposed in and transversely of a ray beam to be detected, said layers having corresponding edges spaced apart at one end of the detector element to form a light emitting opening between said spaced edges, whereby light emitted at the facing surfaces of the layers may be directed transversely of the ray beam for application upon a light target disposed outwardly of the ray beam, and optical light transferring means disposed in position to receive light at said opening and to transfer and apply the same upon said target, including a collecting lens element having a spheroidal light receiving surface disposed in said opening in position to receive light emitted by said layers.

References Cited in the file of this patent

UNITED STATES PATENTS

| Number | Name | Date |
|---|---|---|
| 1,672,671 | Young | June 5, 1928 |
| 2,086,718 | Knoll | July 13, 1937 |
| 2,461,241 | Shann | Feb. 8, 1949 |
| 2,525,147 | Nelson | Oct. 10, 1950 |
| 2,552,858 | Mueller et al. | May 15, 1951 |
| 2,583,132 | Altar et al. | Jan. 22, 1952 |
| 2,583,143 | Glick | Jan. 22, 1952 |
| 2,602,142 | Meloy | July 1, 1952 |
| 2,640,160 | Collins et al. | May 26, 1953 |
| 2,681,417 | Ball | June 15, 1954 |
| 2,695,964 | Schepker | Nov. 30, 1954 |
| 2,709,221 | Haupt et al. | May 24, 1955 |
| 2,747,104 | Jacobs | May 22, 1956 |
| 2,796,527 | Oosterkamp et al. | June 18, 1957 |

FOREIGN PATENTS

| Number | Country | Date |
|---|---|---|
| 562,168 | Great Britain | June 21, 1944 |